US010728086B2

United States Patent
Rao et al.

(10) Patent No.: US 10,728,086 B2
(45) Date of Patent: Jul. 28, 2020

(54) SYSTEM AND METHOD FOR PROVIDING A REDUNDANT COMMUNICATION PATH BETWEEN A SERVER RACK CONTROLLER AND ONE OR MORE SERVER CONTROLLERS

(71) Applicant: DELL PRODUCTS, LP, Round Rock, TX (US)

(72) Inventors: Balaji Bapu Gururaja Rao, Austin, TX (US); Elie A. Jreij, Pflugerville, TX (US); Pushkala Iyer, Round Rock, TX (US); Cyril Jose, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 64 days.

(21) Appl. No.: 15/467,695

(22) Filed: Mar. 23, 2017

(65) Prior Publication Data

US 2018/0278468 A1   Sep. 27, 2018

(51) Int. Cl.
*H04L 12/24* (2006.01)

(52) U.S. Cl.
CPC ........ *H04L 41/0663* (2013.01); *H04L 41/044* (2013.01)

(58) Field of Classification Search
CPC .. H04L 41/0659; H04L 41/0654; H04L 41/06
USPC ........................ 370/225; 700/90, 282; 710/38
See application file for complete search history.

(56) References Cited

U.S. PATENT DOCUMENTS

| 6,883,065 | B1 | 4/2005 | Pittelkow et al. |
| 2012/0136489 | A1* | 5/2012 | Wang ................. G05D 23/1934 700/282 |
| 2015/0160627 | A1* | 6/2015 | Maddukuri ............. G06F 1/206 700/90 |
| 2015/0248315 | A1* | 9/2015 | Ragupathi ........... H04L 41/0806 709/226 |
| 2015/0253029 | A1* | 9/2015 | Palmer ..................... F24F 11/30 700/276 |
| 2015/0293868 | A1* | 10/2015 | Hishida ............... G06F 11/2028 710/38 |
| 2015/0311952 | A1* | 10/2015 | Varma ................... H04L 41/069 455/41.1 |
| 2016/0313777 | A1 | 10/2016 | Ragupathi et al. |

OTHER PUBLICATIONS

U.S. Appl. No. 15/211,381, filed Jul. 15, 2016.
U.S. Appl. No. 15/177,551, filed Jun. 9, 2016.

* cited by examiner

*Primary Examiner* — Kwang B Yao
*Assistant Examiner* — Syed M Bokhari
(74) *Attorney, Agent, or Firm* — Larson Newman, LLP

(57) ABSTRACT

A server rack may include a chassis controller for the server rack and a set of baseboard management controllers (BMCs) corresponding to servers stored in the server rack. Each BMC is communicatively connected to the chassis controller internal to the server rack. Each BMC is also communicatively connected to a network switch located external to the server rack to communicate with the set of BMCs using the network switch. When a first BMC loses communication with the chassis controller internal to the server rack, the first BMC communicates with the chassis controller via a second BMC and the network switch.

15 Claims, 3 Drawing Sheets

SYSTEM AND METHOD FOR PROVIDING A REDUNDANT COMMUNICATION PATH BETWEEN A SERVER RACK CONTROLLER AND ONE OR MORE SERVER CONTROLLERS

FIELD OF THE DISCLOSURE

This disclosure generally relates to information handling systems, and more particularly relates to providing a redundant communication path between a server rack controller and one or more server controllers.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, server systems, data storage systems, and networking systems.

SUMMARY

A server rack may include a chassis controller for the server rack and a set of baseboard management controllers (BMCs) corresponding to servers stored in the server rack. Each BMC is communicatively connected to the chassis controller internal to the server rack. Each BMC is also communicatively connected to a network switch located internal or external to the server rack to communicate with the set of BMCs using the network switch. When a first BMC loses communication with the chassis controller internal to the server rack, the first BMC communicates with the chassis controller via a second BMC and the network switch.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
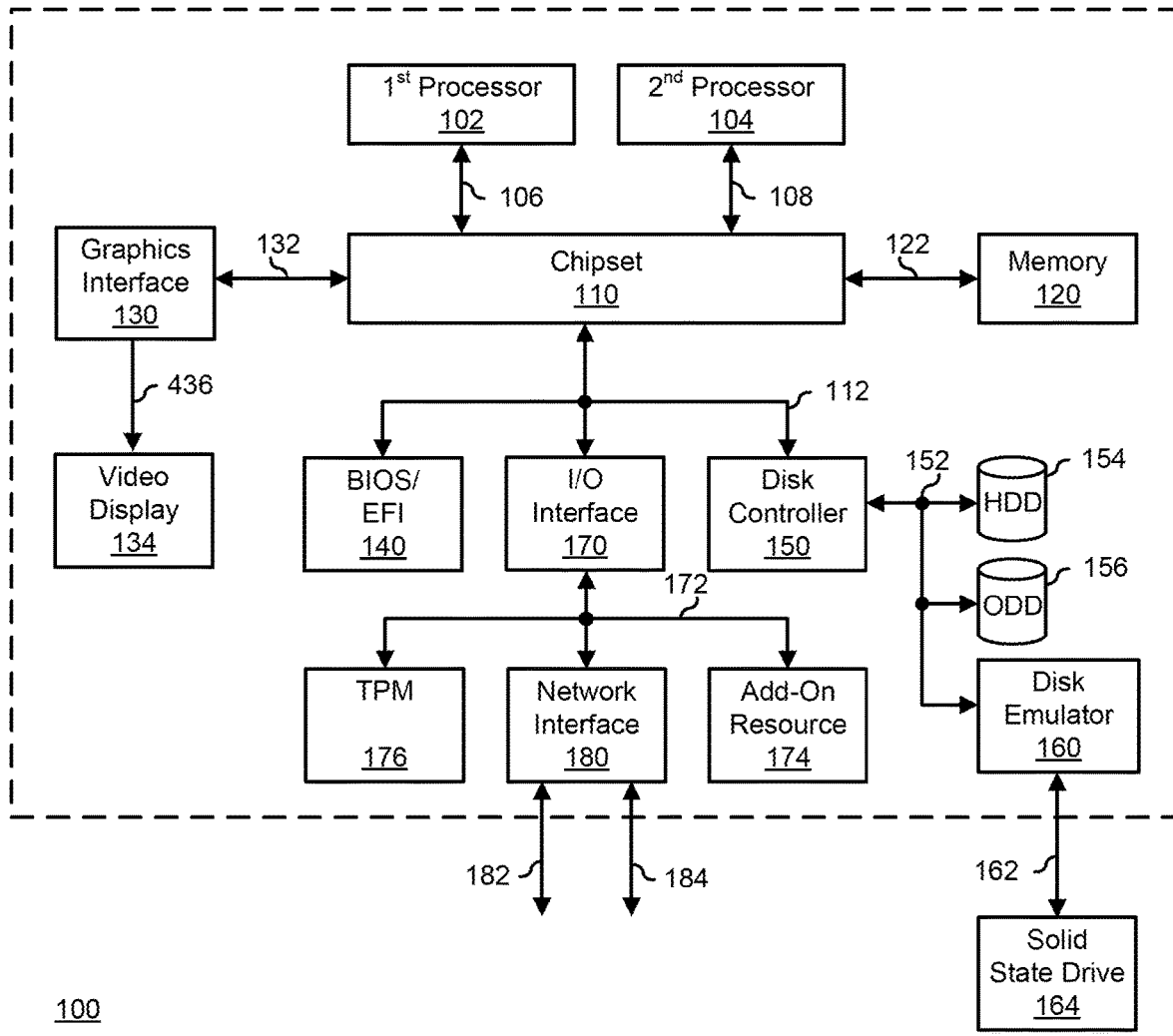
FIG. 1 is a block diagram illustrating a generalized information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a server system, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174, to a TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

An example of an information handling system is a server. An individual server may be a part of a set of servers which may form a server system. A set of servers may be stored in a server rack which may have a server rack chassis defining the physical space or outline of the server rack. The server rack may be an active or smart server rack which communicates with the servers stored in the server rack chassis. The server rack may have a server rack motherboard which supports a server rack or chassis controller (SC). The SC may communicate with the servers stored in the server rack and may incorporate configuration or control capabilities. Thus, the SC allows for a server rack to be an active or smart server rack with computational, control, and communication capacities.

An individual server may have a server chassis defining a physical shape or footprint of the server, and a server motherboard contained within the server chassis. The BMC may function as a server controller for the server. The server motherboard may support a baseboard management controller (BMC) for the server. The SC of the server rack may communicate with individual BMCs of the servers stored in the server rack over a corresponding physical connection for a BMC according to a communication protocol. That is, the SC may communicate with the BMCs of the servers over a channel provided by a physical connection, such as a bus, between the SC and the BMCs according to a communication protocol for the channel. Example communication protocols include Inter-Integrated Circuit (IIC) protocol variants and Intelligent Platform Management Bus (IPMB) protocol variants.

As would be understood by one of skill in the art, the servers stored in the server rack may have one or more Input/Output (I/O) ports for communication with a network, such as the internet. The I/O ports of the servers may be in communication with the respective BMCs of the servers. That is, a BMC of a server may be in communication with the I/O port of the server. The I/O ports of the servers may be connected to a switching fabric such that the servers may communicate with each other via the switching fabric.

Figure 2:
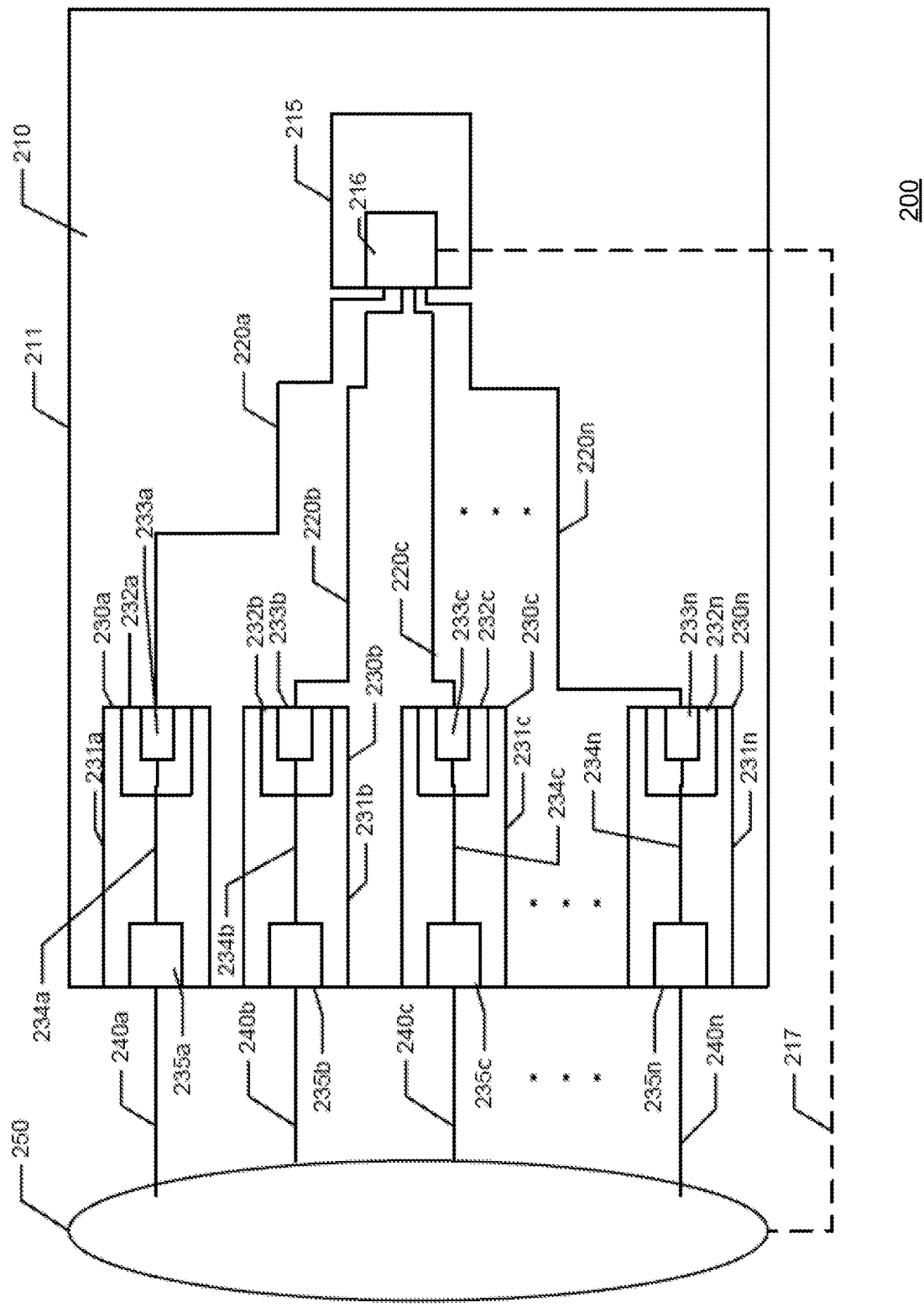
FIG. 2 illustrates an example server rack system according to an embodiment of the present disclosure.

FIG. 2 shows an example of a server rack system 200. Server rack system 200 includes server rack 210 storing servers 230a-230n. Server rack 210 has a server rack chassis 211 defining the geometric shape and footprint of server rack 210. Server rack 210 is an active or smart server rack and includes a server rack motherboard 215 interior to chassis 211 supporting an SC 216 for server rack 210. Server rack 210 stores servers 230a-230n in slots defined at least partially interior to server rack chassis 211.

Server 230a includes server chassis 231a which defines the geometric shape and footprint of server 230a and fits into a corresponding slot (not shown) in server rack 210. Server 230a includes server motherboard 232a located interior to server chassis 231a. Server motherboard 232a supports BMC 233a for server 230a. Server 230a further includes I/O port 235a for connection of server 230a to a network. I/O port 235a is connected with BMC 233a by internal server connection 234a.

Similarly, server 230b includes server chassis 231b which defines the geometric shape and footprint of server 230b and fits into a corresponding slot (not shown) in server rack 210. Server 230a includes server motherboard 232b located interior to server chassis 231b. Server motherboard 232b supports BMC 233b for server 230b. Server 230b further includes I/O port 235b for connection of server 230b to a network. I/O port 235b is connected with BMC 233b by internal server connection 234b. Server 230c includes server chassis 231c which defines the geometric shape and footprint of server 230c and fits into a corresponding slot (not shown) in server rack 210. Server 230c includes server motherboard 232c located interior to server chassis 231c. Server motherboard 232c supports BMC 233c for server 230c. Server 230c further includes I/O port 235c for connection of server 230c to a network. I/O port 235c is connected with BMC 233c by internal server connection 234c.

Such server components and configuration may persist up to n servers. Thus server 230n includes server chassis 231n which defines the geometric shape and footprint of server 230n and fits into a corresponding slot (not shown) in server rack 210. Server 230n includes server motherboard 232n located interior to server chassis 231n. Server motherboard 232n supports BMC 233n for server 230n. Server 230n further includes I/O port 235n for connection of server 230n to a network. I/O port 235n is connected with BMC 233n by internal server connection 234n.

SC 216 is coupled to each of servers 230a-230n and respective BMCs 233a-233n by a corresponding connection 220a-220n and communicates with each of BMCs 233a-233n over corresponding connections 220a-220n according to a communication protocol. That is, for example, SC 216 of server rack 210 is connected to BMC 233a of server 230a by connection 220a, and SC 216 communicates with BMC 233a over connection 220a according to a communication protocol. Thus connection 220a provides a channel for communication between SC 216 and BMC 233a according to the communication protocol.

Furthermore, each of servers 230a-230n may be connected to a switching fabric 250 external to server rack chassis 211 via respective I/O connections 240a-240n; that is, each of I/O connections 240a-240n is coupled to respective I/O ports 235a-235n of servers 230a-230n. As each BMC 233a-233n of servers 230a-230n is connected to I/O ports 235a-235n by respective internal server connections 234a-234n, each BMC 233a-233n of servers 230a-230n is connected to switching fabric 250. For example, BMC 233a of server 230a is connected to I/O port 235a of server 230a by internal server connection 234a, and I/O port 235a is connected to switching fabric 250 by I/O connections 240a such that BMC 233a is communicatively connected to switching fabric 250.

BMCs 233a-233n may be able to communicate with each other over switching fabric 250. In embodiments, SC 216 may be connected to switching fabric 250 via server chassis network connection 217. In such embodiments, SC 216 may be able to communicate with BMCs 233a-233n over switching fabric 250. If a connection or communication capability between an individual BMC of BMCs 233a-233n and SC 216 interior to server rack 210 is lost or becomes unreliable, then communications between the individual BMC and SC 216 may be performed via switching fabric 250, for example via another BMC of BMCs 233a-233n in communication with SC 216. Thus individual BMC connections to switch fabric 250 may be leveraged to provide a redundant communication path between SC 216 and the BMCs.

In an active server rack chassis, BMCs of servers stored in the server rack may be connected to the server rack SC over a bus through a many to one switch interior to the server rack chassis that the SC controls. The SC thus communicates with any BMC by switching the switch. Since SC controls the switch, SC initiates the communication request with respect to a specific BMC and the BMC responds. Thus, at the communication level, the BMC is a slave and SC is the master. Communication between SC and BMC(s) follows this request response model.

When either a BMC or the SC is reset, SC initiates communication. As a part of a handshake process performed as part of initiating communication with a BMC, the SC may send chassis configuration information such as inventory, power, voltage, current readings, Hard Drive Status, and other information to the BMC. Once this handshake between SC and specific BMC is completed, SC periodically sends sensor information containing information on fan speeds, power supply Status, Hard Drive Status, and other information to the specific BMC. The BMC responds to this sensor information by sending the sled control temperatures such as Central Processing Unit (CPU) and dual in-line memory module (DIMM) temperatures and sled critical temperature based on SC managed fan speeds in a sensor information response. This information exchange between SC and BMC may serve as a heartbeat. A BMC maintains a timeout after which the BMC requests restart of handshake by setting an action bit in a sent sensor information response. Any request for restarting the communication may thus be done by setting an action bit in response to sensor information received from the SC. Also any action that is to be initiated by a BMC (such as SC firmware update, Power Capping, Setting Chassis Service Tag) will be done by setting action bits in response to receiving sensor information from the SC.

Having a continuous communication between the BMC of a server and SC is relevant to healthy operation of the server. Loss in the communication can lead to serious degradation of server performance. While a communication loss results in SC re-initiating the above-described handshake, there is serious setback in SC initiated recovery as the SC presumes that communication loss between SC and server BMC is detrimental to server health. While a communication loss results in SC re-initiating the handshake, there is serious setback in SC initiated recovery as SC based recovery presumes that the SC can restart communication when the SC detects a communication loss and that the SC is always available to restart the negotiation. These presumptions may be incorrect.

For example, buggy SC firmware has resulted in an SC failing to send heartbeat commands to a server. Since the server BMC cannot initiate handshake, there has been a complete loss of communication between BMC and SC. Also, the communication protocol between BMC and SC may be unreliable or prone to bugs and information loss, resulting in communication failure between BMC and SC. Further, there may be a loss or failure in the physical bus connection between server and SC.

To overcome this problem of loss of communication between BMC and SC, the capabilities of BMCs to communicate over switching fabric external to the server rack chassis is leveraged to develop or provide a redundant communication path for BMCs to communicate with the server rack chassis SC in the event communication capacity between the SC and one or more BMCs is lost interior to the server rack chassis.

Figure 3:
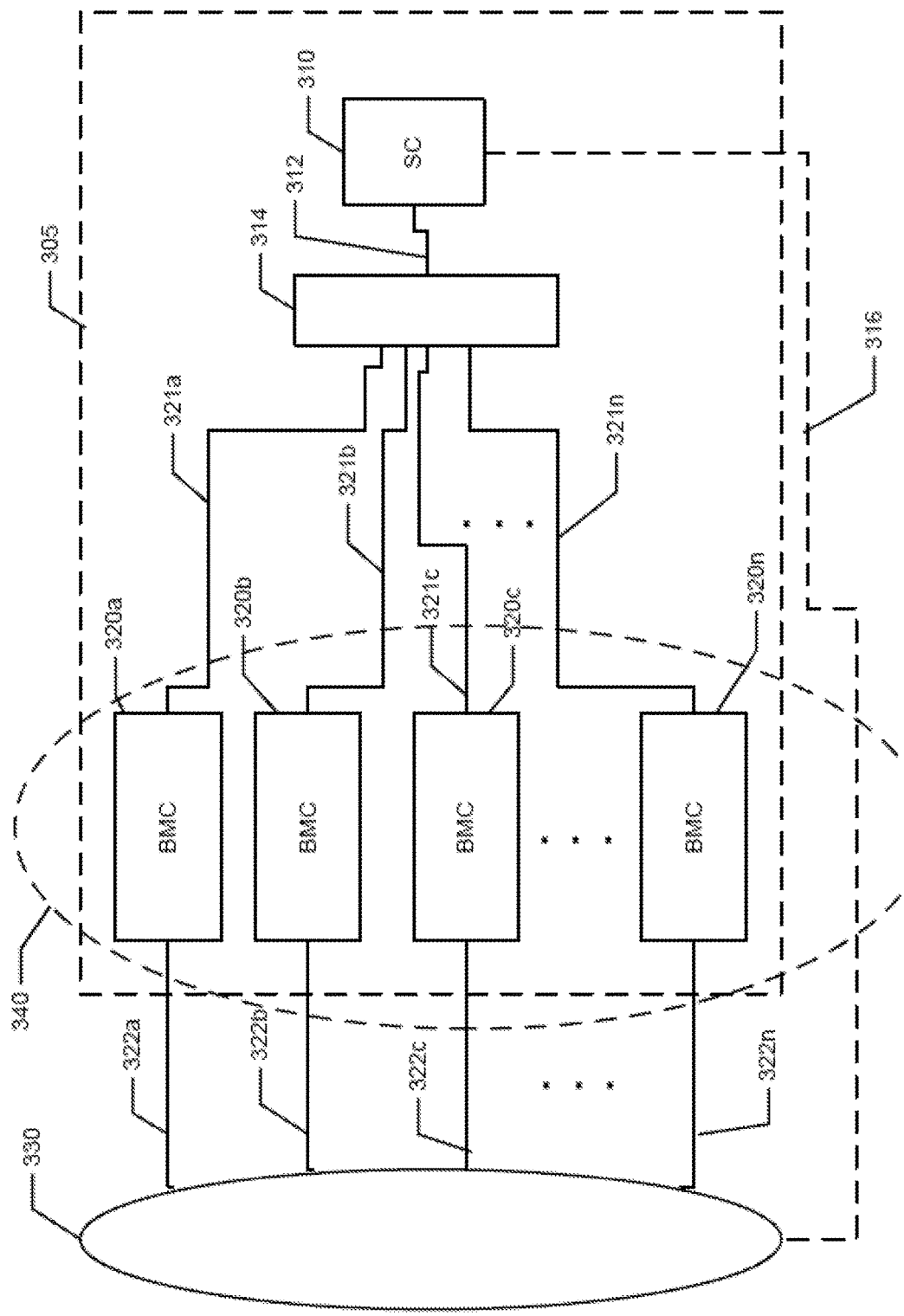
FIG. 3 illustrates an example logical representation of a server rack system according to an embodiment of the present disclosure.

FIG. 3 shows a logical representation 300 of a server rack system, such as, for example, server rack system 200. In server rack system logical representation 300, passive physical elements such as chassies and motherboards have generally been omitted for simplicity of representation. Logical representation 300 includes SC 310 for the server rack, and BMCs 320a-320n for the servers stored in the server rack (not shown). 305 encapsulates server rack components and indicates the server rack interior.

SC 310 is communicatively coupled to BMCs 320a-320n by internal switch 314 (internal to the server rack, internal to 305) which is controlled by SC 310. More particularly, SC is communicatively connected to internal switch 314 by SC switch connection 312 and communicates and controls switching of internal switch 314 according to a communication protocol. Internal switch 314 in turn is connected to each of BMCs 320a-320n by corresponding BMC connections 321a-321n. For example, BMC 320a is connected to internal switch 314 by BMC connection 321a. Thus, SC 310 may control internal switch 314 to be communicatively connected to each of BMCs 320a-320n via corresponding BMC connections 321a-321n.

As discussed herein, communications between SC 310 and BMCs 320a-320n may be unreliable, and communication with one or more BMCs may be lost due to a physical connection failure, or communication protocol failure. Accordingly, it is desirable to provide a redundant communication path and mechanism for communication between SC 310 and BMCs 320a-320n.

Empirically, in operation of the servers corresponding to BMCs 320a-320n stored in the server rack, each of BMCs 320a-320n will be communicatively connected to a network switching fabric, such as a switch, shown in FIG. 3 as network switch 330. In FIG. 3, each of BMCs 320a-320n is connected to network switch 330 via corresponding network connections 322a-322n. For example, BMC 320a is communicatively connected to network switch 330 by network connection 322a. In embodiments, SC may also be connected to network switch 330, as shown, for example, by SC network connection 316.

Thus, each of BMCs 320a-320n may communicate with each other via network switch 330. Further in embodiments in which SC network connection exists and is operable, each of BMCs 320a-320n may communicate with SC 310 via network switch 330. When an individual BMC 320 loses communication with SC 310 via an internal server rack connection such as BMC connection 321, internal switch 314, or SC switch connection 312, then that BMC may communicate with another BMC via network switch 330 and network switch 330 may transmit or route communications between the BMC with lost communication connection and SC 310. BMCs may unicast to individual BMCs over network switch 330 or BMCs may multicast to BMCs over network switch 330; the multicast may include SC 310 when SC 310 is connected to network switch 330. For example, if BMC 320a loses connection 321a to SC, then BMC 320a may ask BMC 320b over network 330 to proxy traffic between BMC 320a and SC through connection 321b.

For example, with regard to BMC 320c, if BMC 320c loses communication with SC 310 internal to the server rack (internal to 305), then BMC 320c may communicate with SC 310 through another of the BMCs via switch 330 which may be leveraged to provide a redundant path of communication between BMC 320c and SC 310. That is, if communication between BMC 320c and SC 310 is lost over BMC connection 321c, internal switch 314 or SC switch connection 312 due to physical connection failure or communication protocol failure, then BMC 320c may communicate with SC 310 via relaying from BMC 320b using the connection between BMCs 320c and 320b over switch 330. And BMC 320b sends data from BMC 320c to SC 310 through 321b. Of course, other BMCs may be so used.

Particularly, BMC 320c may communicate one or messages to BMC 320b and BMC 320b may forward or relay on these messages from BMC 320c to SC 310 using its (BMC 320b) own connection to SC 310. BMC 320c may send messages to be relayed to SC 310 over network connection 322c to network switch 330. BMC 320b receives these messages to be relayed to SC 310 from BMC 320c over connection 322b connecting BMC 320b with switch 330. BMC 320b then forwards these messages received from BMC 320c to SC 310 over its connection with SC 310 internal to 305, namely BMC network connection 321b, internal switch 314 and SC switch connection 312.

Continuing with the example of BMC 320b providing a redundant path for communication between SC 310 and BMC 320c, SC 310 may likewise communicate with BMC 320c using BMC 320b. SC 310 may recognize that communication with BMC 320c has been lost internal to the server rack, and send one or more messages to be relayed to BMC 320c over internal connections, namely SC switch connection 312, internal switch 314 and BMC network connection 321b to BMC 320b. BMC 320b may then forward these messages for BMC 320c to BMC 320c over network switch 330. That is, BMC 320b sends messages from SC 310 to switch 330 over BMC network connection 322b. BMC 320c receives these messages from SC 310 over network connection 322c, and may respond as detailed above. Thus, communications between BMCs over network switch 330 may be leveraged to provide a redundant path for communication with SC 310.

In embodiments in which SC 310 is communicatively connected to network switch 330 (for example, by SC network connection 316), network switch 330 may be used to communicate between SC 310 and individual BMCs and relaying messages using other BMCs may be avoided. For example, if internal connection or communication between SC 310 and BMC 320c is lost interior to the server rack, for example, due to physical connection failure or communication protocol failure over BMC connection 321c, internal switch 314 or SC switch connection 312, then SC 310 and BMC 320c may communicate via network switch 330. That is, BMC 320c may transmit messages for SC 310 to network switch 330 over corresponding BMC network connection 322c. Then SC 310 may receive these messages from BMC 320c over SC network connection 316 from switch 330. Conversely, SC 310 may transmit messages for BMC 320c to network switch 330 over SC network connection 316. Then BMC 320c may receive these messages from SC 310 over corresponding BMC network connection 322c from switch 330.

In a further embodiment, BMCs 320a-320n of servers stored in the server rack may be logically amalgamated into a reliability group 340, as shown in FIG. 3. Reliability group 340 may be considered the set of BMCs of servers stored in the server rack (internal to 305) and configured to communicate with the server rack SC and may be considered to be a logical amalgamation of BMCs. An individual BMC of a reliability group may be designated as the group manager. The group manager may manage or coordinate communications among the BMCs in the reliability group and monitor the status of individual BMCs in the reliability group.

In embodiments in which SC 310 is communicatively connected to network switch 330 by SC network connection 316 such that SC 310 may communicate with BMCs over a network, SC 310 may also be amalgamated into reliability group 340 such that reliability group 340 includes SC 310. In embodiments, the BMCs communicate over a network using multicast addressing and communication, and may transmit and receive according to an internet protocol such as IPv6 communication standard and variants.

In a reliability group, the BMCs and/or the SC may send communication status reports to the BMC designated as the group manager such that the group manager maintains a snapshot of BMC connectivity with the SC.

For example with regard to FIG. 3, BMC 320a may be designated the group manager for reliability group 340. SC 310 may periodically send status reports to BMC 320a reporting the connectivity or communication status between SC 310 and individual BMCs 320a-320n. An individual status report from SC 310 may be a compendium status report for multiple BMCs or may be for individual BMCs. As group manager, BMC 320a maintains a table compiling the status reports and indicated connectivity or communication status of SC 310 with BMCs 320a-320n, as shown below:

TABLE 1

| BMC | SC Communication |
|---|---|
| 320a | Yes |
| 320b | Yes |
| 320c | No |
| 320k | Yes |
| 320n | Yes |

Individual BMCs 320b-320n may also periodically send status reports to BMC 320a reporting the respective connectivity or communication status with SC 310. In further embodiments, the status reports may also include BMC server temperatures such as Critical, CPU and memory module, such as DIMM, temperatures. As group manager, BMC 320a maintains a table compiling the status reports and indicated connectivity or communication status with SC 310 from BMCs 320b-320n, as shown below:

TABLE 2

| BMC | SC Communication | DIMM Temp. (C.) | CPU Temp. (C.) | Critical Temp. (C.) |
|---|---|---|---|---|
| 320a | Yes | 20 | 24 | 25 |
| 320b | Yes | 23 | 27 | 27 |
| 320c | No | 22 | 25 | 26 |
| 320k | Yes | 23 | 27 | 27 |
| 320n | Yes | 23 | 27 | 27 |

Thus BMC 320a as group manager of reliability group 340 maintains a snapshot of connectivity between SC 310 and BMCs 320a-320n by monitoring status reports from BMCs 320a-320n and SC 310 and compiling the same. If the group manager determines that communication has failed between an individual BMC and SC, then the group manager may initiate a communication reconfiguration to remediate loss of communication between SC and BMC. For example, from Tables 1 and 2 above, group manager BMC 320a is aware that SC 310 and BMC 320c have lost communication, and signals SC 310 and BMC 320c to restart communications with each other interior to the server rack. Until communications between SC 310 and BMC 320c interior to the server rack have resumed, group manager BMC 320a acts as a forwarding agent between SC 310 and BMC 320c to provide a redundant communication path between the same as detailed above.

For example with regard to re initializing communications between SC 310 and BMC 320c, SC 310 sends a sensor information request to group manager BMC 320a, group manager BMC 320a forwards the request to BMC 320c via network switch 330. In response, BMC 320c sends a set sensor information response to group manager BMC 320a via network switch 330, group manager BMC 320a forwards the set sensor information response to SC 310, thereby allowing for re-initialization of the communication link between SC 310 and BMC 320c interior to the server rack.

If communication cannot resume between BMC 320c and SC 310 interior to the server rack due to hardware issues, such as a fault in 321c, then group manager BMC 320a may continue to act as a proxy between BMC 320c and SC 310 by forwarding communications between BMC 320c and SC 310 over switch 330 to provide a redundant communication path between the same. Furthermore, the group manager for a reliability group may send other information to individual BMCs in the reliability group, such as updates, including firmware updates.

In a further embodiment, the SC may communicate solely with the group manager BMC of the reliability group internal to the server rack, and the group manager may relay communications from the SC to the desired BMC of the reliability group. The advantage of this approach is that the group manager will have a direct connection to the SC internal to the server rack and so may initiate communications with the SC. If the connection between the SC and the group manager BMC fails, another BMC may take over as group manager and communicate with the SC.

For example, with regard to FIG. 3, group manager BMC 320a may be continuously communicatively connected to SC 310 via BMC connection 321a, internal switch 314 and SC switch 312. Group manager BMC 320a may act as a proxy between SC 310 and BMCs 320b-320n, forwarding messages from SC 310 to BMCs 320b-320n over switch 330, and receiving messages from BMCs 320b-320n over switch 330 and forwarding the messages to SC 310 internal to the server rack.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A server rack system comprising:
   a server rack;
   a chassis controller for the server rack;
   a set of baseboard management controllers (BMCs) for servers stored in the server rack;
   an interior bus communications connection from each baseboard management controller in the set of BMCs to the chassis controller internal to the server rack;
   an external redundant communications connection from a port in each BMC to an external network switch located external to the server rack;
   an external chassis network connection from the chassis controller to the external network switch; and
   executable code stored by the chassis controller, the executable code causing the chassis controller to perform operations comprising:
   logically amalgamating the set of BMCs into a reliability group to provide the external redundant communications connection via the external network switch to the chassis controller;
   designating a BMC of the set of BMCs as a group manager;
   designating the group manager to act as a proxy forwarding agent;
   detecting a loss of the interior bus communications connection from the chassis controller to another baseboard management controller in the set of BMCs;
   in response to the loss of the interior bus communications connection, establishing a communication from the chassis controller to the group manager acting as the proxy forwarding agent via the external chassis network connection to the external network switch; and
   sending a handshake communication to the group manager acting as the proxy forwarding agent for forwarding via the external redundant communications connection to the another baseboard management controller.

2. The server rack system of claim 1, wherein a first of the baseboard management controllers sends a communication to a second of the baseboard management controllers via the external network switch.

3. The server rack system of claim 2, wherein the second of the baseboard management controllers forwards the communication to the chassis controller.

4. The server rack system of claim 1, wherein the interior bus communications connection utilizes a communication standard.

5. The server rack system of claim 4, wherein the external redundant communications connection utilizes a different communication standard from the communications standard.

6. The server rack system of claim 1, wherein the chassis controller is connected to the external network switch.

7. The server rack system of claim 1 wherein the group manager receives messages from communication with the chassis controller.

8. The server rack system of claim 1, wherein the group manager receives messages from the chassis controller.

9. An information handling system comprising:
   a server rack having a chassis controller;
   a set of servers installed in slots within the server rack, each server of the set of servers having a corresponding baseboard management controller (BMC) forming a set of BMCs located internal to the server rack;
   a controller connection from the chassis controller to an external network switch located external to the server rack;
   an internal bus communications connection from each BMC in the set of BMCs to the chassis controller internal to the server rack;
   a redundant external communications connection from each BMC to the external network switch located external to the server rack; and
   a manager of the set of BMCs acting as a forwarding agent for communications between the chassis controller and each corresponding BMC;
   wherein in response to a timeout associated with the internal bus communications connection, the chassis controller determines a loss of the internal bus communications connection between the chassis controller and a BMC in the set of BMCs, the chassis controller establishes a communication with the manager of the set of BMCs via the controller connection to the external network switch and sends a handshake communication to the manager for forwarding via the redundant external communications connection.

10. The information handling system of claim 9, wherein a first BMC in the set of the BMCs sends a first communication to a second BMC in the set of the BMCs via the external network switch.

11. The information handling system of claim 10, wherein the second BMC forwards the first communication to the chassis controller.

12. The information handling system of claim 9, wherein the set of BMCs is logically amalgamated into a reliability group.

13. The information handling system of claim 12, wherein the chassis controller is logically amalgamated into the reliability group.

14. The information handling system of claim 9, wherein the manager receives messages from the BMCs via the external network switch.

15. The information handling system of claim 9, wherein the manager receives messages from the chassis controller via the external network switch.

* * * * *